(12) United States Patent
Stoupis et al.

(10) Patent No.: US 7,751,166 B2
(45) Date of Patent: Jul. 6, 2010

(54) ADVANCED FEEDER ARCHITECTURE WITH AUTOMATED POWER RESTORATION

(75) Inventors: James D. Stoupis, Durham, NC (US); Donato Colonna, Raleigh, NC (US); David L. Lubkeman, Lake Mary, FL (US); Jaichander K. Vellore, Durham, NC (US); Robert E. Goodin, Debury, FL (US); Timothy S Fahey, Apex, NC (US); Varagur Ramanan, Cary, NC (US)

(73) Assignee: ABB Technology AG, Zurich (CH)

( * ) Notice: Subject to any disclaimer, the term of this patent is extended or adjusted under 35 U.S.C. 154(b) by 481 days.

(21) Appl. No.: 11/687,213

(22) Filed: Mar. 16, 2007

(65) Prior Publication Data

US 2008/0225452 A1 Sep. 18, 2008

(51) Int. Cl.
*H02H 7/00* (2006.01)
*H02H 3/00* (2006.01)
*H02J 3/38* (2006.01)

(52) U.S. Cl. .............................. 361/64; 361/66; 307/23; 700/286; 700/293

(58) Field of Classification Search .................... 361/64, 361/66; 307/23; 700/286, 293
See application file for complete search history.

(56) References Cited

U.S. PATENT DOCUMENTS

| | | | |
|---|---|---|---|
| 5,973,899 A * | 10/1999 | Williams et al. | ............... 361/72 |
| 6,243,244 B1 | 6/2001 | Nelson et al. | |
| 6,347,027 B1 | 2/2002 | Nelson et al. | |
| 6,405,104 B1 | 6/2002 | Dougherty | |
| 6,469,629 B1 | 10/2002 | Campbell et al. | |
| 6,754,789 B2 | 6/2004 | Skendzic et al. | |
| 6,816,757 B1 * | 11/2004 | De La Ree et al. | ........... 700/286 |
| 6,947,269 B2 | 9/2005 | Lee et al. | |
| 7,110,231 B1 | 9/2006 | Ree et al. | |
| 7,154,722 B1 | 12/2006 | Stoupis et al. | |
| 2003/0231440 A1 | 12/2003 | Papallo | |
| 2004/0158772 A1 | 8/2004 | Pan et al. | |
| 2005/0251296 A1 * | 11/2005 | Tracy Nelson et al. | ....... 700/292 |

* cited by examiner

*Primary Examiner*—Robert DeBeradinis
*Assistant Examiner*—Scott Bauer
(74) *Attorney, Agent, or Firm*—Michael M. Rickin; Michael C. Prewitt

(57) ABSTRACT

A method and apparatus for restoring power to loads connected to a feeder powered by a power source. The feeder is provided with a plurality of switching devices and a master electronic device which is in operative communication with the switching devices and has a plurality of power restoration plans stored therein. Upon occurrence of a fault in a zone of the feeder, the identity of the switching device which is closest to and upstream from the faulted zone relative to the power source is used in order to select a power restoration plan and restore power to some or all the loads connected to non-faulted zones of the feeder from one or more additional feeders.

15 Claims, 8 Drawing Sheets

ADVANCED FEEDER ARCHITECTURE WITH AUTOMATED POWER RESTORATION

FIELD OF THE INVENTION

The present invention relates in general to the field of controlling faults in electrical power systems. More particularly, the present invention relates to a method and apparatus that are adapted to identify and isolate faults occurring in a power feeder and to automatically restore power to loads which are connected to non-faulted sections of the same feeder.

BACKGROUND OF THE INVENTION

As known, electrical power systems deliver power to consumers using an interconnected arrangement of transmission lines, distribution feeders, electrical equipments etc. Power distribution systems are typically configured so that electrical power can be supplied by two or more alternative sources, although only one source can supply the network at a given instant, and can be the supplied to loads over more than one path within the network. Configuring a power distribution system in this manner reduces the potential for a single-point fault to leave large numbers of loads or users without electrical power upon occurrence of electrical faults. To this end, known power systems are equipped with different types of cooperating switching devices, namely circuit breakers or reclosers, i.e. devices capable to intervene and interrupt the flow of power upon occurrence of a fault, and sectionalizers or disconnectors, i.e. devices which are not designed to intervene and clear an electrical fault but are devised to isolate faulted sections of a feeder once the fault is cleared by the intervention of a recloser (or of a circuit breaker).

For example, when a fault is detected, reclosers are adapted to trip thereby interrupting the flow of electrical power and clearing the fault condition on at least a temporary basis. In particular, a typical recloser is adapted to close after a predetermined interval of time to restore the flow of electrical power into the network. Transient-type faults may be cleared by repeated open close operations of a recloser thus eliminating prolonged power outages and unnecessary service interventions. When instead the fault persists, the recloser intervening remains locked in the open position and a sectionalizer isolates the faulted section of the network. Hence, the section of the network having a fault therein is de-energized and isolated so that other non-faulted sections of the network can possibly be re-energized and the associated loads re-supplied as quickly as possible. In order to achieve such a result in an optimized and effective way, it would be desirable to provide a solution able to adapt the architecture of the power system to the contingent conditions occurred and to restore power to as many loads as possible from alternative sources or even from the same source following an alternative path, in an efficient, safe and reliable way.

SUMMARY OF THE INVENTION

In accordance with the present invention, a method for restoring power to loads connected to a first feeder powered by a power source, said first feeder being provided with a plurality of switching devices and at least one master electronic device which is in operative communication with said switching devices and has a plurality of power restoration plans stored therein, the method comprising:

upon occurrence of a fault in a zone of said first feeder, isolating the faulted zone from the power source using a first one of said switching devices which is positioned upstream from the faulted zone relative to the power source thereby disconnecting power to loads connected to the faulted zone and non-faulted zones of the first feeder;

using the identity of the switching device which is closest to and upstream from the faulted zone relative to the power source, selecting a power restoration plan from the plurality of restoration plans stored in said master electronic device; and outputting instructions from said master electronic device to one or more of said switching devices so as to execute the restoration plan selected and restore power to at least some of the loads connected to non-faulted zones of the first feeder from one or more additional feeders connected to said power source or to one or more additional power sources.

Also provided in accordance with the present invention, there is an electrical power system comprising:

at least one power source;

at least a first feeder powered by said power source and feeding a plurality of loads connected therewith, said first feeder being provided with a plurality of switching devices;

at least a first master electronic device operatively associated with said first feeder and having a plurality of power restoration plans stored therein, said first master electronic device being in operative communication with said switching devices; wherein upon occurrence of a fault in a zone of said first feeder, a first one of said switching devices which is positioned upstream from the faulted zone relative to the power source isolates the faulted zone from the power source thereby disconnecting power to loads connected to the faulted zone and non-faulted zones of the first feeder, and then said master electronic device first selects a power restoration plan from said plurality of power restoration plans stored using the identity of the switching device which is closest to and upstream from the faulted zone relative to the power source and then outputs instructions to one or more of said switching devices so as to execute the restoration plan selected and restore power to at least some of the loads connected to the non-faulted zones of the first feeder from one or more additional feeders connected to said power source or to one or more additional power sources.

Further, the present invention provides an electronic control device suitable to be used in a power system comprising at least a power source, at least a first feeder powered by said power source and feeding a plurality of loads connected therewith, and a plurality of switching devices distributed throughout said first feeder, the electronic control device comprising:

a communication unit for operatively communicating with said switching devices;

a memory storing a set of power restoration plans; and a microprocessor which—upon occurrence of a fault in a zone of said feeder and operation of a first one of said switching devices isolating the faulted zone from the power source thereby disconnecting power to loads connected to the faulted zone and non-faulted zones of the first feeder—first selects a power restoration plan from said set of power restoration plans using the identity of the switching device which is closest to and upstream from the faulted zone relative to the power source and then outputs instructions to one or more of said switching devices so as to execute the restoration plan selected and restore power to at least some of the loads connected to the non-faulted zones of the first feeder from one or more additional feeders connected to said power source or one or more additional power sources.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
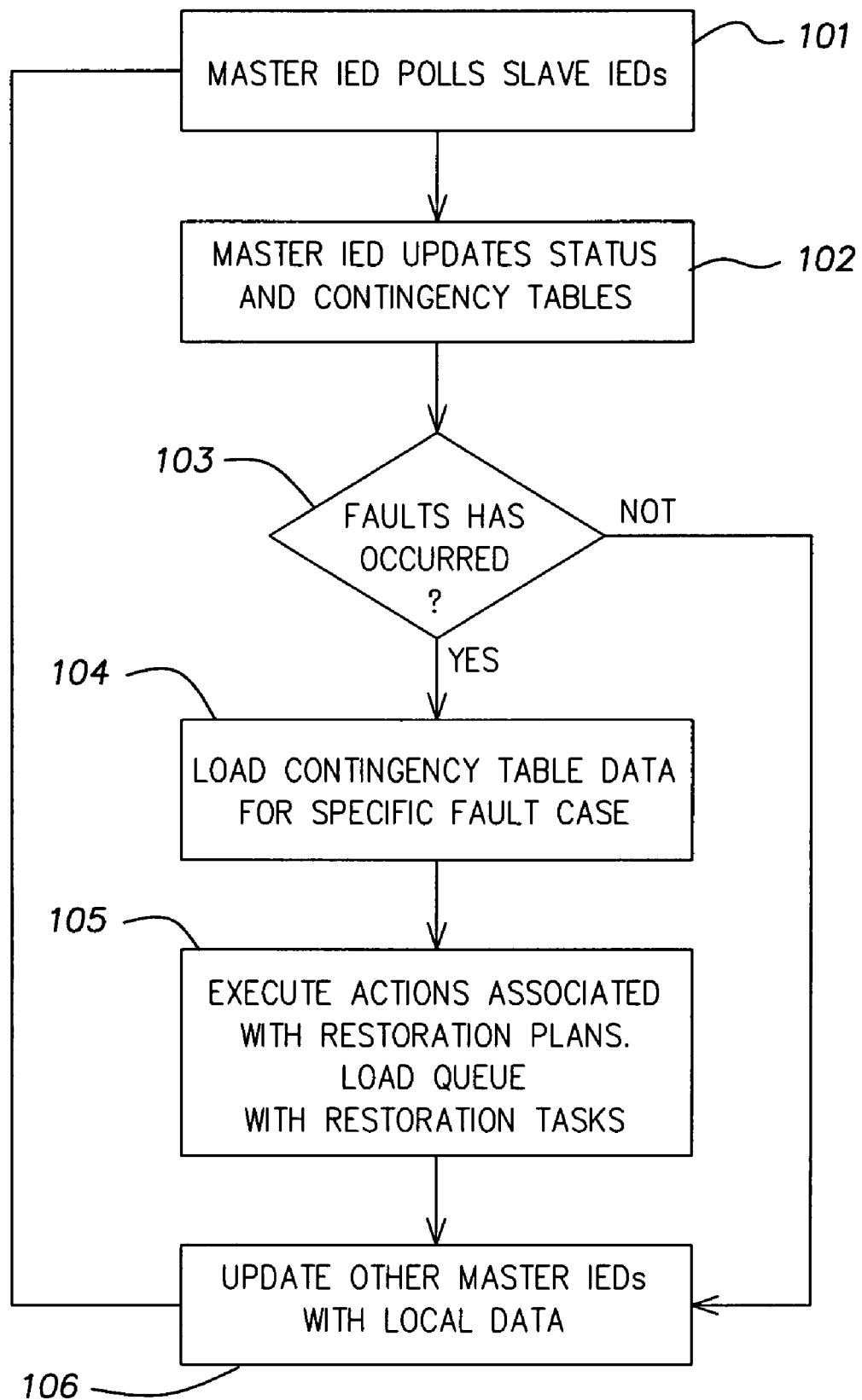
FIG. 1 is an exemplary flow diagram illustrating a method for restoring power to loads connected to a feeder according to the present invention.

It should be noted that in the detailed description that follows, identical or similar components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
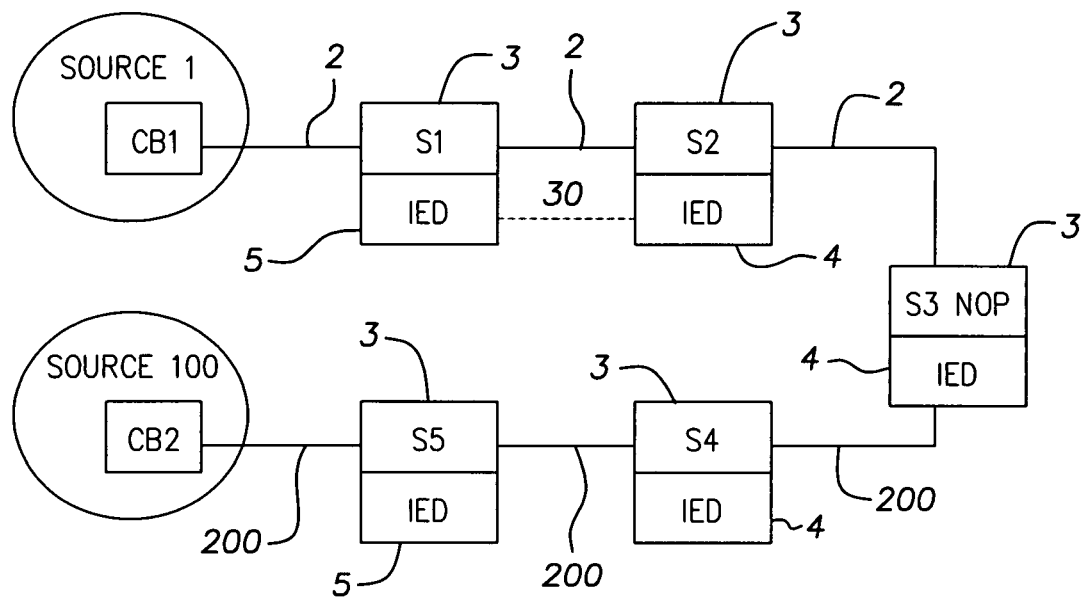
FIG. 2 is a first schematic example of a power distribution system according to the invention in a looped configuration.
Figure 3:
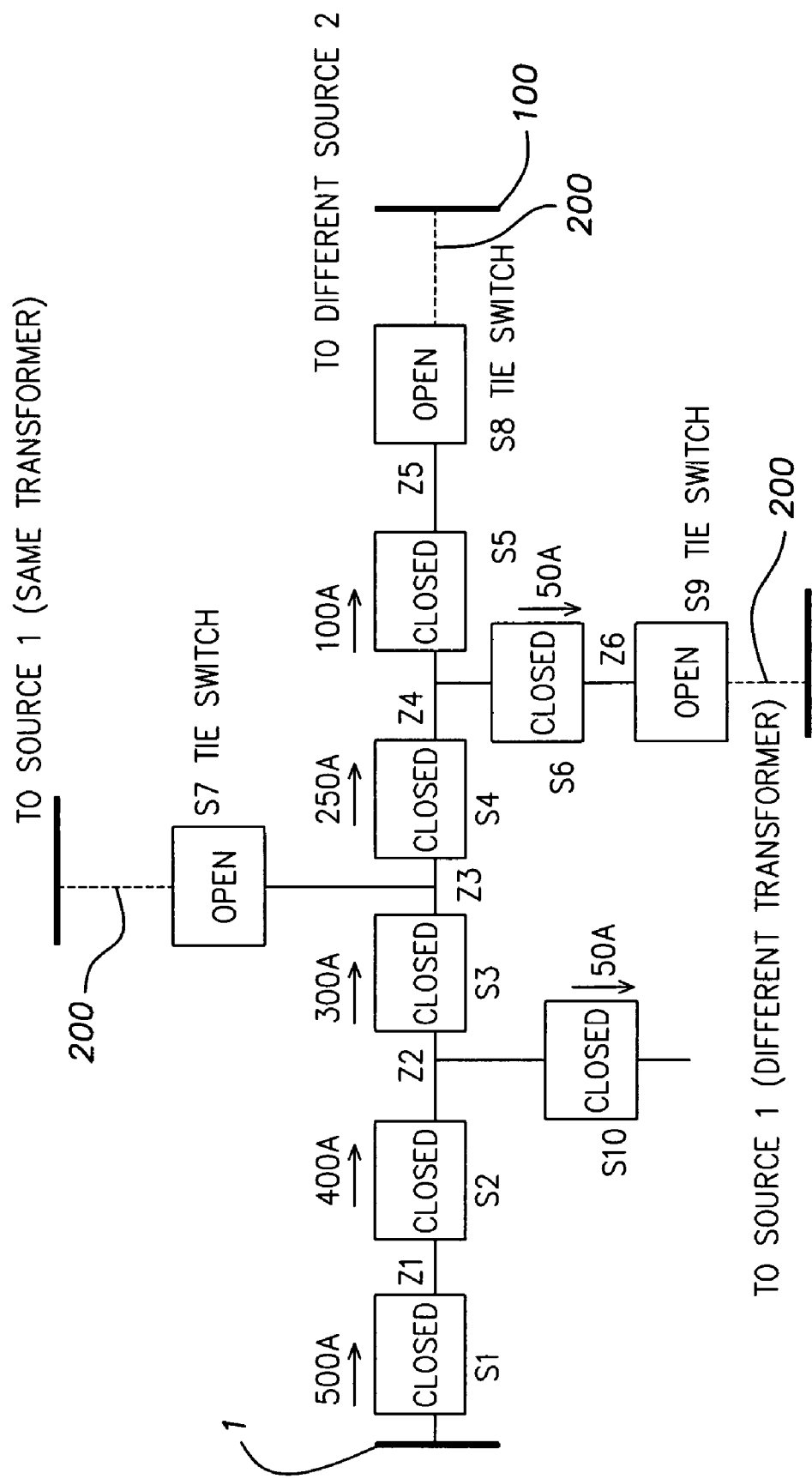
FIG. 3 is a second schematic example of a power distribution system according to the invention in a multi back-feed configuration.

FIGS. 2 and 3 show two possible examples of power distribution systems according to the present invention. In the embodiments illustrated, the power distribution system comprises a first power source 1, for example an electric substation, a first feeder 2, i.e. an electric line or a piece of electric line distributing power to various loads (not illustrated) which are connected therewith throughout its extension. Under normal operating conditions, the first feeder 2 is powered by the power source 1. The feeder 2 is provided with a plurality of switching devices 3, indicated in the figures as CB1, S1, S2, S3 ... S9, S10 et cetera, which divide the feeder 2 into various segments or zones, e.g. three in the exemplary embodiment of FIG. 2. The switching devices 3 positioned along the feeder 2 can usually be of two types. A first type comprises devices which are deemed to intervene and clear electrical faults, such reclosers or circuit breakers. A second type includes devices such as disconnectors or sectionalizers which do not normally intervene in presence of faults but are designed to isolate faulted sections of a feeder, e.g. once an electrical fault is cleared by the intervention of a recloser. Depending on the applications and/or specific needs, other similar or functionally equivalent devices may be also used such as load-break switches.

The switching devices 3 are provided with or operatively coupled to corresponding intelligent electronic devices (hereinafter IEDs,) 4, constituted for example by microprocessor-based relays. In the present invention, the various IEDs 4 are in operative communication with each other.

Measurements capabilities are made available at the various switching devices 3. For example, reclosers preferably have current measurements on each phase, while voltage measurements may be optional and can limited to just one phase for sensing voltage restoration on all the phases of a feeder. Sectionalizing devices can have either voltage or and/or current measurements. These measurements capabilities can be provided only on one side or both sides of the various switching devices 3. If certain measurements are not available at a specific switching device location, information from other parts of the feeder 2 could be used by exploiting the communication among the various IEDs 4.

The power system further comprises at least one master intelligent electronic device IED 5 which is operatively associated with the first feeder 2 and has a set of power restoration plans stored therein. In particular, the master IED 5, constituted for example by a microprocessor-based relay, can be independent from any switching device 3 or can be either embedded or operatively coupled to one of them.

Figure 4A:
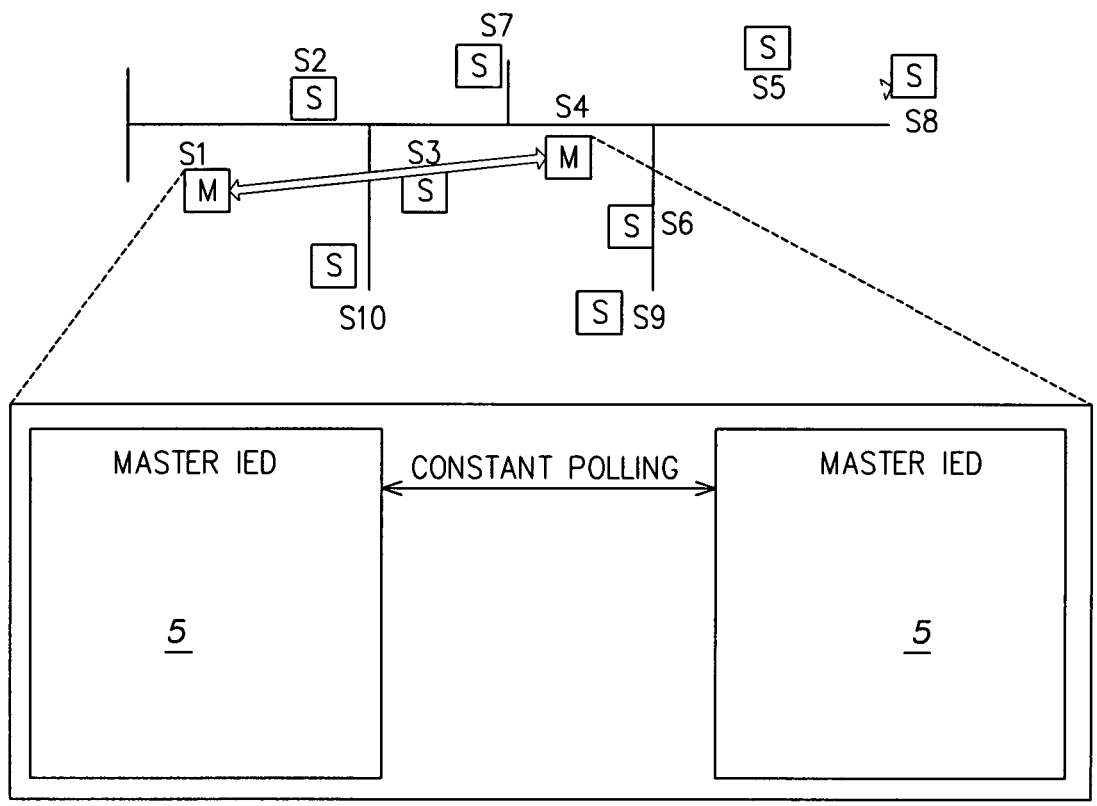
FIG. 4a schematically shows a feeder with magnified parts so as to illustrate the interaction between two master units.
Figure 4B:
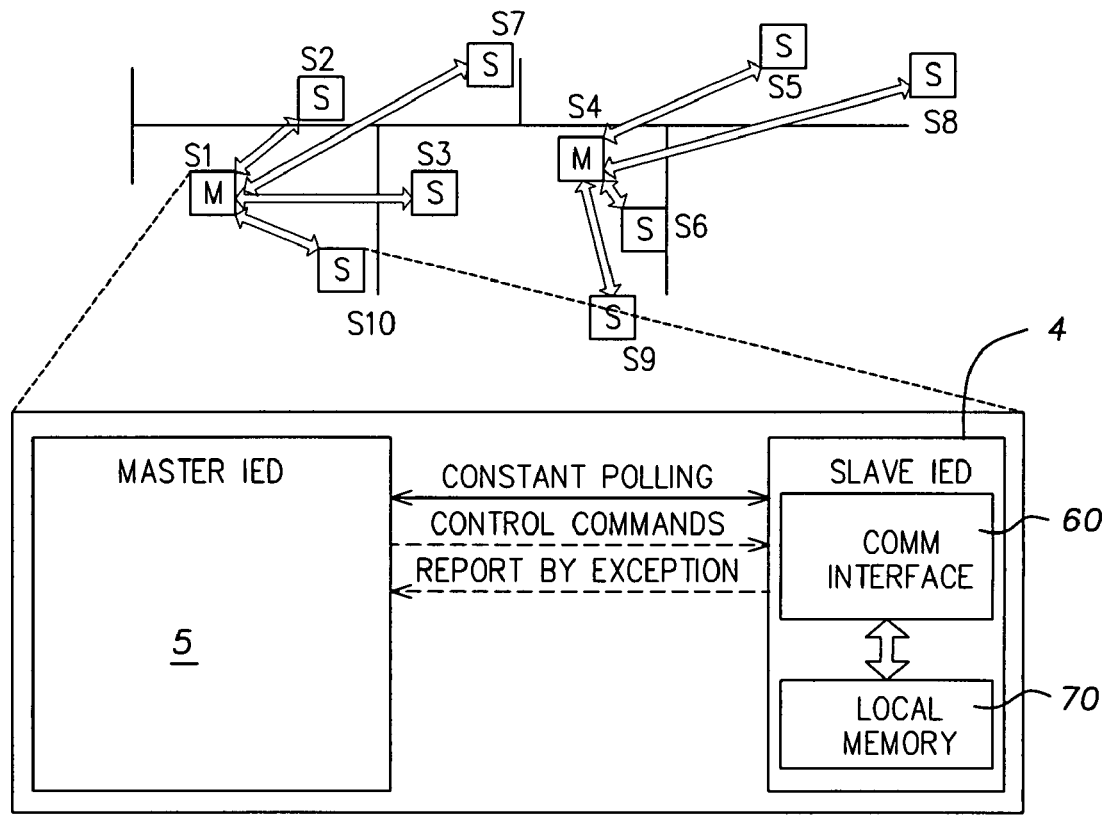
FIG. 4b schematically shows a feeder with two magnified parts so as to illustrate the interaction between a master unit and an associated slave unit.

As schematically illustrated in FIG. 4b, the master IED 5 is in operative communication with some of or all the switching devices 3 of the feeder 2 through their respective IEDs 4, in a master-to-slave configuration. Hence, the master IED 5, through the slave IEDs 4, may control the switching devices 3 as part of the restoration plan that is executed after a fault occurs in a certain zone of the feeder. The operative communication can be realized either in a wireless manner or alternatively by using wired connections 30, schematically represented only in FIG. 2 solely for the switching devices 3 indicated as S1 and S2. In practice, the slave IEDs 4 are controllable by the assigned master IED 5. When the master IED 5 polls the associated slave IEDs 4, the polled IEDs are able to provide switching status and measurement data through communication using for example a standard protocol, such as DNP over Ethernet.

If the feeder 2 is provided with more than one master IED 5, the control of the various switching devices 3 can be divided among the various master IEDs 5 used.

Figure 4C:
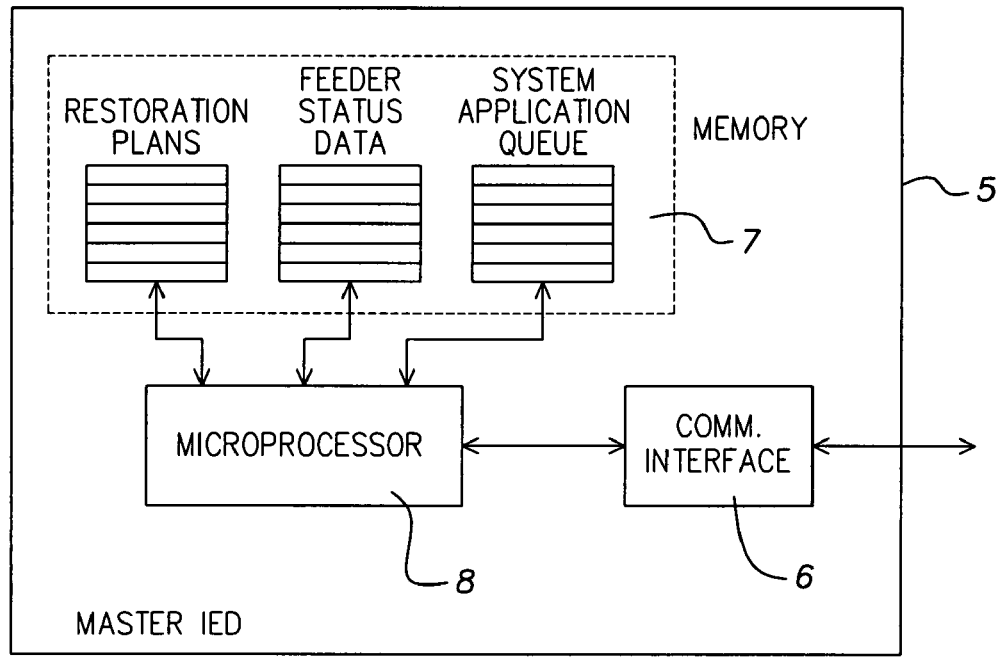
FIG. 4c is a block diagram schematically showing a master intelligent electronic device.
Figure 5:
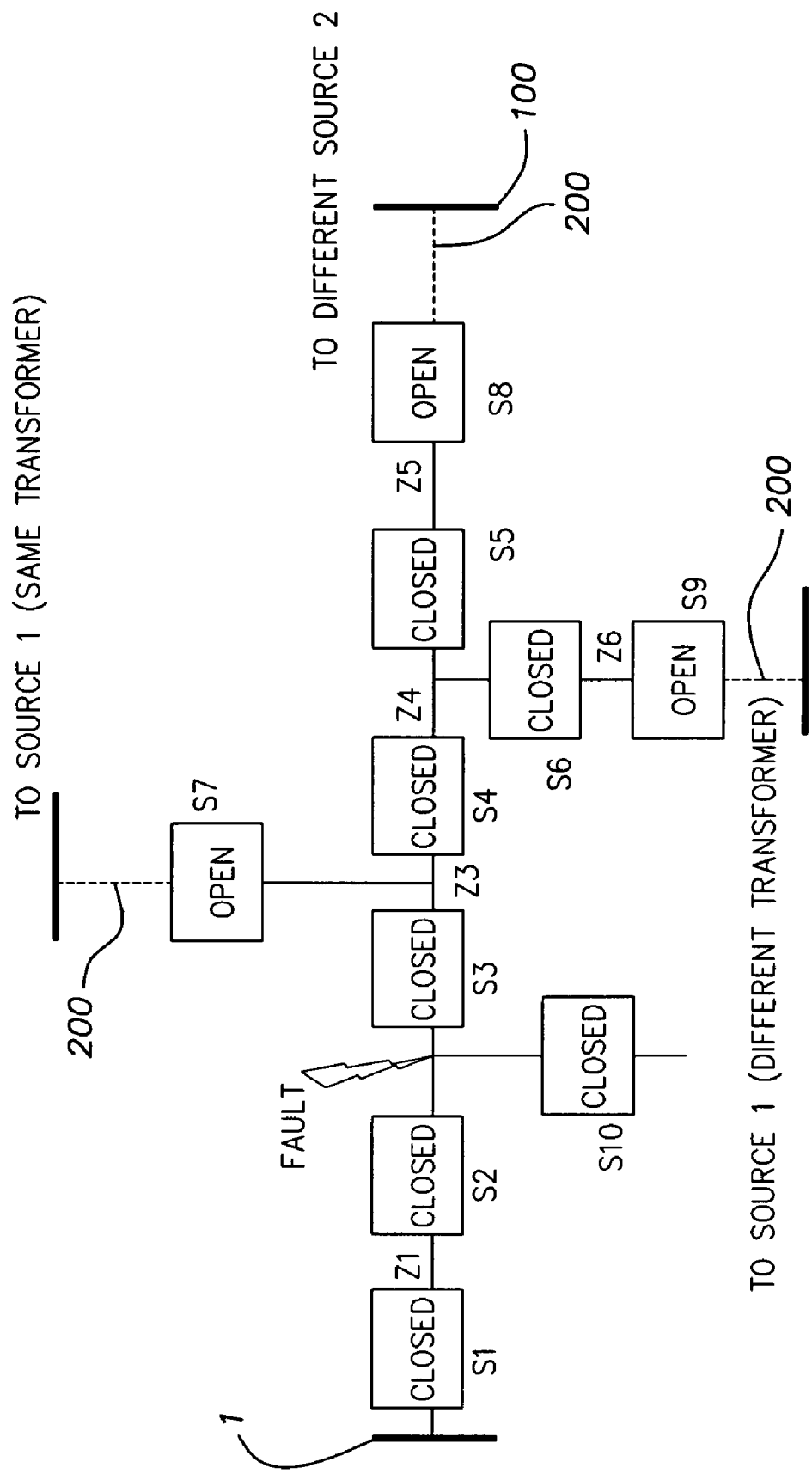
FIGS. 5-8 are different configurations of the powers distribution system of FIG. 3 during execution of a power restoration plan.
Figure 6:
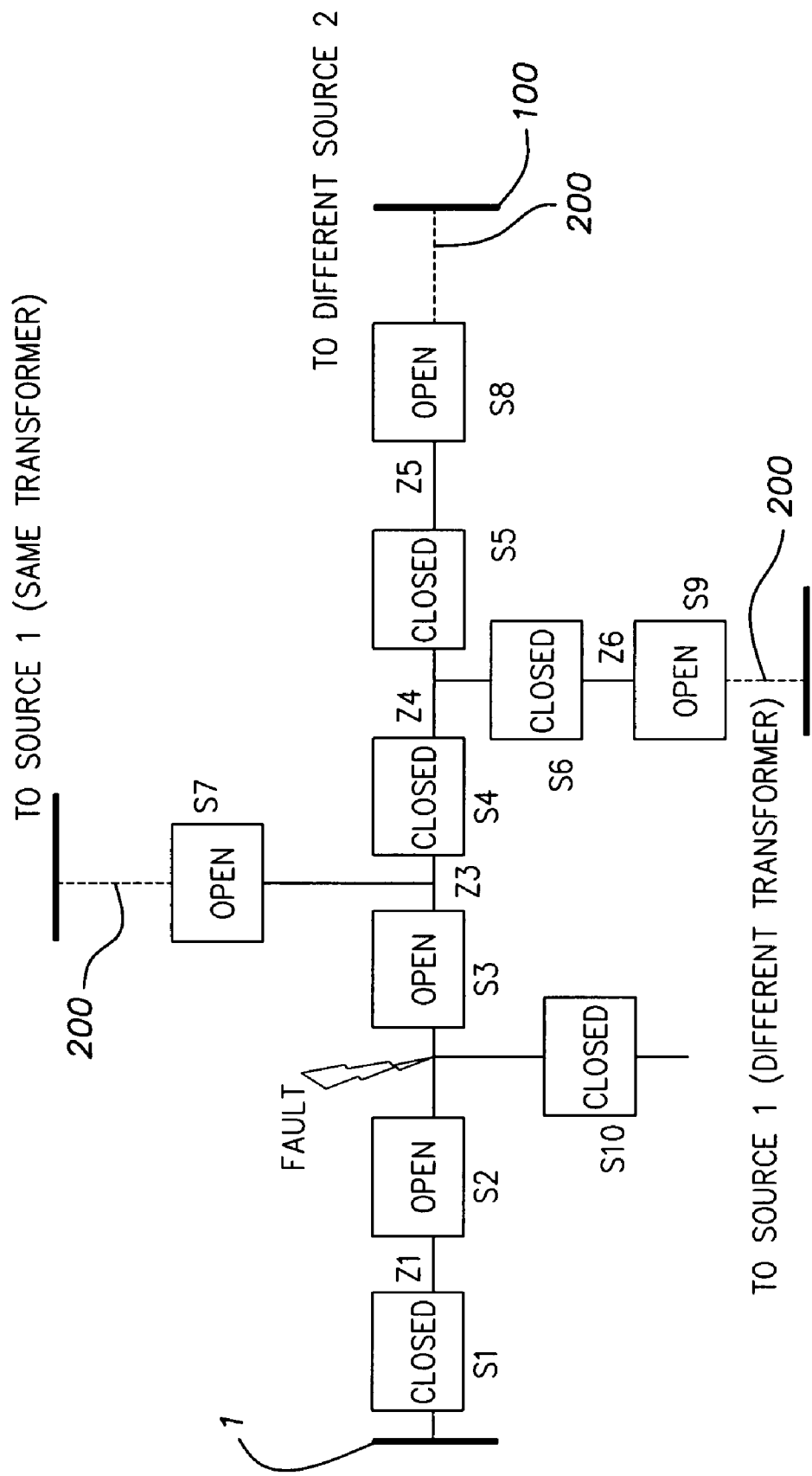
Figure 7:
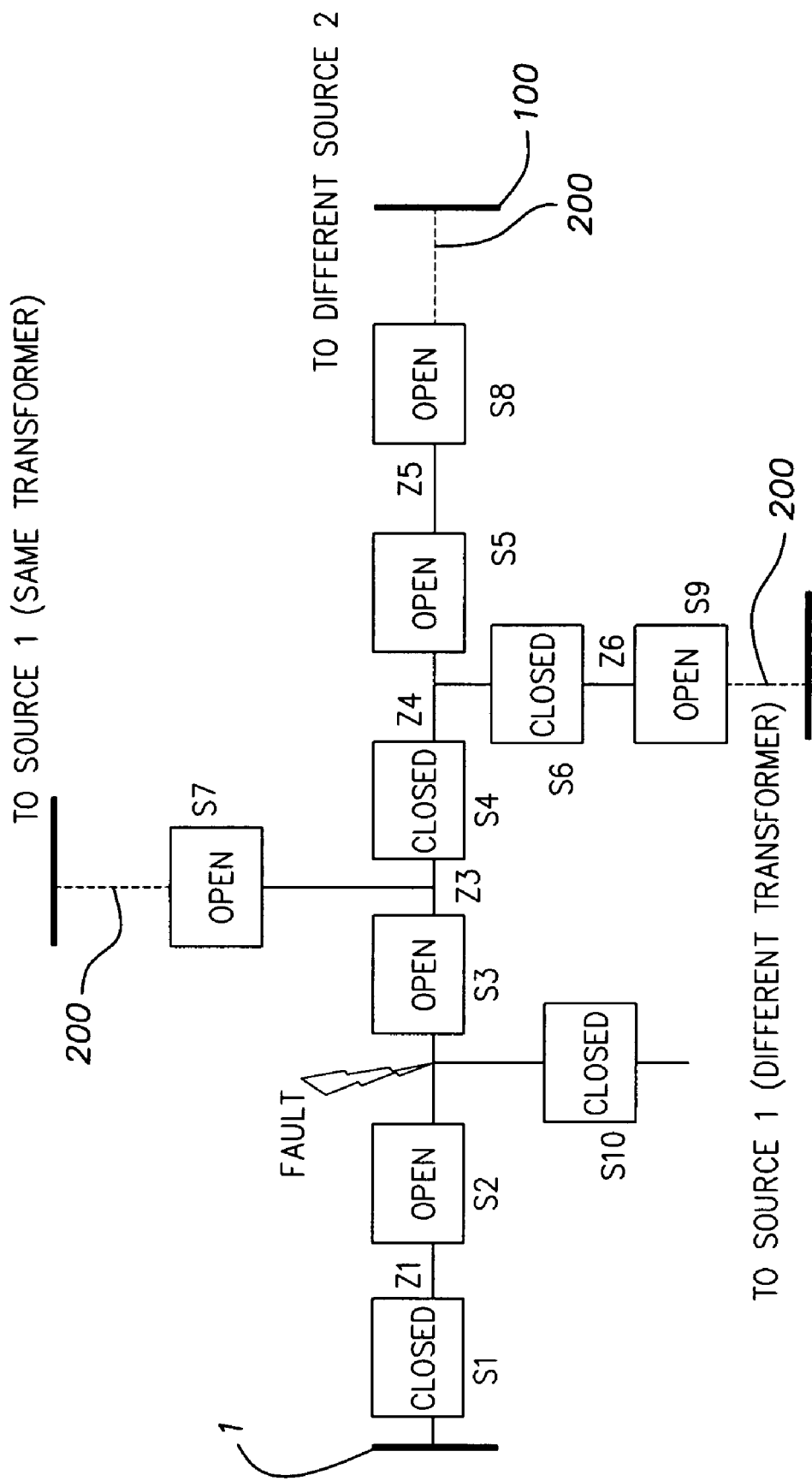
Figure 8:
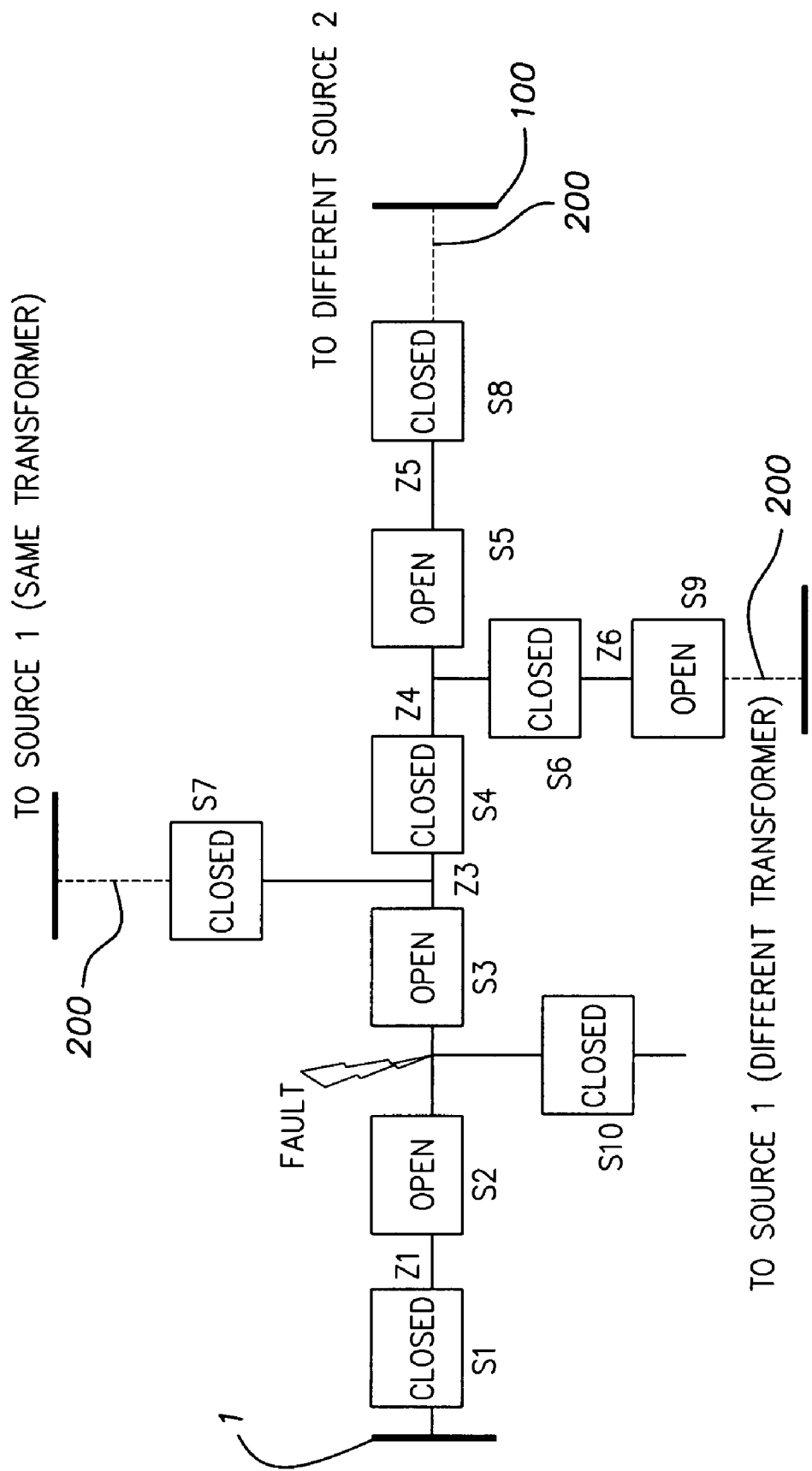

As schematically illustrated in FIG. 4c, each master IED 5 comprises a communication interface or unit 6 for operatively communicating at least with a slave IED 4 and/or another master IED 5, a memory 7 which contains the feeder status data, the restoration plans, and the system application queue, and a microprocessor 8 whose function will be described in more detail hereinafter. The restoration plans are pre-computed ahead of time to speed up the restoration process and are preferably stored in the form of one or more tables.

Alternatively, the restoration plans can be stored in different forms, for example they can be arranged as structures made in C-language which are initialized by a file resident in the memory 7 of the IED 5.

In turn, as illustrated in FIG. 4b, each slave IED 4 comprises a communication interface or unit 60, a local memory 70, and can be provided with a microprocessor not shown in the figures.

As shown in the embodiments illustrated, the power system comprises usually one or more additional feeders 200. Each of the additional feeders 200 can be connected to the same power source 1 feeding the feeder 2 or to one or more alternative power sources 100. For example, in the embodiment of FIG. 2, only one additional feeder 200 is present which is connected to a source 100 so as to realize a so-called looped system. In turn, in the embodiment of FIG. 3 there are illustrated several feeders 200. As illustrated, one of the additional feeders 200 is connected to a different source 100, a second feeder 200 is connected to the source 1 through the same transformer of the feeder 2, and a third feeder 200 is again connected to the same source 1 through a different transformer. In this example, a multi back-feed system or network is therefore realized.

Each additional feeder 200 comprises a plurality of associated switching devices 3. As illustrated for simplicity only for the embodiment of FIG. 2, like the feeder 2, the additional feeder 200 is provided with some switching devices 3 indicated in FIG. 2 as S5, S4, S3 which are associated with respective IEDs 4 and are in communication with each other. The feeder 200 comprises also at least one corresponding master IED 5, which is coupled in the embodiment illustrated with the switching device S5. Each master IED 5 of a feeder 200 is also in a master to-slave operative communication with some or all of the switching devices 3 which are positioned on the same feeder 200 and are under its control, in the same way as described for the feeder 2. In particular, when the feeder 2 is under normal operating conditions, i.e. there is not a fault which requires intervention and modification of the power distribution layout, the various feeders 2, 200 are connected in such a way that they are electrically isolated from each other. To this end, for example, at the tie point between two feeders there is a switching device 3 which is normally open under such normal operating conditions. This switching device 3, which is usually indicated as a Tie Switch, functionally belongs to both the feeders 2, 200. For instance, in the embodiment of FIG. 2 the Tie Switch is constituted by the switching device indicated as S3 which is normally open (indicated in FIG. 2 as NOP) and functionally belongs to both feeders 2 and 200. Therefore, it can be controlled by any of the master IEDs 5 of both feeders 2, 200.

Preferably, the various master IEDs 5, which are either positioned on the same feeder 2 or distributed among different feeders 2, 200, are in a peer-to-peer communication with each other, as shown in FIG. 4a. Also in this case, the communication can be realized in a wireless manner or through the wired connections 30. Further, a master IED 5 associated with a feeder 2 or 200 can communicate with or even control one or more of the IEDs 4 positioned on a different feeder 200, 2.

In particular, the memory unit 7 of a master IED 5 is accessible by one or more of the other master IEDs 5 associated with the same feeder 2 or to different feeders 200. Each master IED 5 shares (e.g. by broadcasting) its feeder status table periodically so that each other master IED 5 can read it and update its corresponding internal memory. In addition, each master IED 5 polls the slave IEDs 4 under its control to keep its feeder status data up to date. The feeder status data is an input to the execution of the restoration algorithms.

In the method according to the invention and as indicated in FIG. 1, when a feeder 2 is distributing power to the various loads connected therewith, its master IED 5 at step 101 polls the slaves IEDs 4 which are within its "operating zone", collecting the necessary data and information. At steps 102 the master electronic device 5 updates the feeder status data and the restoration plans stored in its memory 7 with the new data collected.

If at step 103 a fault is detected in a zone of the feeder 2, a first one of the switching devices 3 having the capability to intervene and clear a fault, e.g. a recloser, which is positioned upstream from the faulted zone relative to the power source 1 intervenes isolating the faulted zone from the power source 1. In this way, power to loads connected to the faulted zone and to non-faulted zones of the feeder 2 is disconnected. At step 104, based on the location of the fault, and in particular using the identity of the switching device which is closest to and upstream from the faulted zone relative to the power source 1, the microprocessor 8 selects from the set of power restoration plans stored in its memory 7 the plan that is more appropriate for the specific fault case.

Preferably, the most appropriate restoration plan is selected by the master IED 5 using also information received from the various slave IEDs 4 about pre-fault conditions, in particular the current loading, i.e. the level of current flowing at each switch location in the feeder 2.

At step 105, the microprocessor 8 executes the selected restoration plan by loading the necessary actions (steps) in the system application queue. Hence, at this step the master IED 5 outputs instructions to one or more of the switching devices 3 so as to execute the selected restoration plan and restore power to at least some of the loads connected to the non-faulted zones of the feeder 2 from one or more additional feeders 200 which are connected to the power source 1 or to one or more additional power sources 100.

The restoration plan can be also executed based on predetermined rules, defined for example by customers, in particular as regard to the choice and sequence of additional feeders 200 and related power sources to be connected to the faulted feeder 2.

In particular, in the method and system according to the present invention, when the first one switching device which intervened clearing the fault is the device 3 which is upstream from and closest to the faulted zone relative to the power source 1, the master IED 5 of the feeder 2 outputs instructions to a second switching device 3, e.g. a sectionalizer, which is positioned downstream from the faulted zone relative to the power source 1. Preferably, the second switching device instructed is the device 3 downstream from and closest to the faulted zone relative to the power source 1. This second switching device 3 is instructed to operate to isolate the faulted zone from loads connected to non-faulted zones of the feeder 2 which are downstream from the faulted zone relative to the power source 1.

If instead the first one switching device 3 which intervened clearing the fault is upstream from to the faulted zone relative to the power source 1 but it is not the closest one to the faulted zone, the master IED 5—as part of the selected restoration plan—preferably outputs instructions also to a third one of the switching devices 3 which is positioned upstream from and closest to the faulted zone relative to the power source 1. In this case the third switching device 3 is the switching device 3 whose identity is used by the master IED 5 to select the most appropriate restoration plan. The order in which the second and third switching devices 3 are instructed and operate can be any. Also in this case, the faulted zone is isolated from loads connected to non-faulted zones of the first feeder which are downstream and upstream from the faulted zone relative to said power source 1, respectively.

The master IED 5 of the feeder 2 then verifies if the second switching device 3 successfully executed the instructions sent to it thereby isolating the faulted zone from loads connected to non-faulted zones of the feeder 2 which are downstream from the faulted zone itself relative to the power source 1. Likewise, when as indicated above also said third switching device 3 is instructed as part of the restoration plan, the master IED 5 also checks if also the third switching device 3 successfully executed the instructions sent to it thereby isolating the faulted zone from loads connected to non-faulted zones of the feeder 2 which are upstream from the faulted zone itself relative to the power source 1.

In addition, the master IED 5 further instructs one or more switching devices 3 other than the first, the second, and in case the third switching devices 3, to operate, i.e. to open, thereby isolating loads connected to non-faulted zones of the feeder 2 from the additional feeders 200 before connecting the non-faulted zones of the feeder 2 to one or more of the additional feeders 200. The master IED 5 then verifies if the instructed switching device(s) 3 (other than the first, second and in case also the third switching devices) successfully operated thereby isolating the loads connected to non-faulted zones of the feeder 2 from the additional feeders 200. Preferably, before connecting the non-faulted zones of the feeder 2 to one or more of the additional feeders 200 so as to restore power to at least some of the loads, the master IED 5 of the feeder 2 checks the presence of voltage on one or more of the additional feeders 200 by checking the status information received by the various slave IEDs 4. Once the presence of voltage is verified, the master IED 5 instructs one or more of the switching devices 3 (other than the first, second, and in case the third switching devices), e.g. Tie Switches, to connect non-faulted zones of the feeder 2 to one or more of the additional feeders 200.

Independently from the detection of a fault, the master IED 5 periodically (step 106) broadcasts the content of its internal memory to the other master IEDs 5 (associated with the additional feeders 200 or associated with the same feeder 2) so that the each master IED is aware of what control actions have taken place in other parts of the system and operations among the various master IEDs 5 are coordinated.

In the case that a feeder 2 is provided with more than one master IEDs, the operation and control over the power restoration plan is assumed by one of the master IEDs 5, for example the master IED 5 which is positioned closest to and upstream from the faulted zone with respect to the power source 1.

Some more details on how the method and system according to the invention work are given hereinafter.

For instance, the table below (split in two parts) is an example of a section of the feeder status data stored in the memory 7 of a master IED 5.

sectionalizer, or a Tie switch (T). Clearly, other types of devices may be listed. The section "Com Status" refers to the integrity (Avail) of the communication with the indication also of the last failure detected.

The second part of the table includes information related to the loading conditions ("Loading") and to the status of the various switching devices (Switch Status). Each switching device 3 of the feeder has measurements and loading constraints associated with it.

The loading and capacity data are used to determine the best restoration plan in case multiple back-feed can be used for restoration. An example of a table containing restoration plans will be given later.

The section "Switch Status" includes the current state, and the normal state (no fault and feeder not reconfigured by a restoration plan) of the switching devices.

The system application queue (see FIG. 4c) is in an area of the memory 7 where the microprocessor 8 posts the sequence of actions that need to be performed according to the selected restoration plan. This posting includes the sequence in which switching devices 3 need to be operated, and the status of what operations have been done or are awaiting for execution. As mentioned above, the main purpose of the system application queue is to enable the coordination of actions of the distributed intelligence functions running on the various master IEDs. An example of the system application queue is reported in the following table:

| Timestamp | Feeder Status | Event ID | Event | Location | Status |
|---|---|---|---|---|---|
| 11:30:00 | Normal | NA | | | |
| 11:30:05 | Faulted | 1 | Breaker Lockout | S1 | Complete |

| Identification | Topology | | | Device description | | Com Status | | |
|---|---|---|---|---|---|---|---|---|
| SW | Child | Sibling | Parent | Role | Type | Avail | % Avail | Last failure |
| S1 | S2 | 0 | 0 | Master | R | Yes | 100 | Null |
| S2 | S3 | 0 | S1 | Master | R | Yes | 70 | Jun. 3, 2005 |
| S3 | S7 | S10 | S2 | Slave | T1 | Yes | 99 | Jan. 1, 2005 |
| S4 | S6 | 0 | S3 | Slave | T2 | Yes | 90 | Mar. 1, 2005 |

| Loading | | Switch Status | |
|---|---|---|---|
| Current capacity | Current load | Normal | Current |
| 800 | 600 | Closed | Closed |
| 500 | 300 | Closed | Closed |
| 300 | 0 | Open | Open |
| 300 | 0 | Open | Open |

Each switching device 3 has a unique identification: switch name (SW), e.g. S1, S2 etc. The topology of the feeder is also contained in the table. Each node is characterized by a Parent, Child and Sibling node. The feeder topology is reduced to a "tree structure" that can be represented in a computer algorithm according to solutions which are well known in the art.

In the first part above table, the section "Device description" indicates whether the switching device is a master IED 5, or a slave IED 4. The column "Type" specifies in this example whether the switching device is a recloser (R), a -continued

| Timestamp | Feeder Status | Event ID | Event | Location | Status |
|---|---|---|---|---|---|
| 11:30:10 | Restoration | 1 | Fault Isolation | S2 | Complete |
| | Restoration | 1 | Backfeed | S3 | In Progress |

This exemplary table shows which are the scheduled events needed to complete a feeder restoration plan. The system application queue can also be accessed through a SCADA/HMI interface in order to view the status of a multi-IED distributed application.

As previously indicated, the target of the method and system according to the invention is to restore power to loads that have been isolated by a faulted section of a feeder 2, as for example the one illustrated in FIG. 3, by using the back-up possibilities offered by the power system itself. In the exemplary system of FIG. 3, permanent faults on feeder segments indicated as Z1, Z2, etc. must be detected, isolated and repaired before the faulted section can be returned to service. While the faulted section is being repaired, the distribution feeder 2 is reconfigured to restore as many affected loads as possible. This involves using alternate sources since the path from the initial source 1 is not available due to the faulted feeder section. In the example illustrated in FIG. 3, there are three different types of additional feeders 200 which can be used to back-feed the feeder 2. The first feeder is back-feed through a Tie Switch S7 that supplies power from an alternate feeder 200 powered by the same source 1 and connected to the same transformer (Type T1) of the first feeder 2. The second possibility is through a Tie switch S8 connected to a feeder 200 (Tie Switch S8) powered by the same source 1, but in this case the additional feeder 200 is connected to a different transformer (Type T2). The third possibility is through Tie Switch S9 connected to a feeder 200 (Tie Switch S9) which is connected to a different power source (Type T3), e.g. another substation. The selection among the possibilities can be indicated by customers who can have prioritizations rules on how they want to back-feed loads. For example, the back-feed priority could be to utilize tie types T1 first, then T2, and then T3. It is also possible to plan using more than one back-feed feeder if there are capacity constraints on using a single additional feeder 200. In this example, the feeder circuit with the initial loading (500 Ampere, 400 Ampere et cetera) shown in FIG. 3 will be assumed. Under normal operating conditions, the switching devices on the feeder 2 are as follows: switching devices S1, S2, S3, S10, S4, S6, S5 are closed while switching devices S7, S8, and S9 are open so as to make the feeder 2 isolated from the other three feeders 200.

As mentioned above, responses to various faults (or contingencies) are pre-computed by a planning function in order to speed up the restoration process and the planned response is correlated to the pre-fault circuit status, to the circuit loading and to the availability of back-feed capacity through one or more additional feeders 200. A closed master IED 5 will be assigned for computing the desired response, for example the master IED 5 which is positioned closest to and upstream from the fault location relative to the power source 1. The restoration response planning function needs to consider various decision criteria. This would include:

the order in which back-feed feeders would be applied to restore service. In the example shown below, the order of priority is (a) restoring to the same source through the same transformer, (b) restoring to the same source but through a different transformer, (c) restoring to an alternate source;

avoiding capacity constraints. For the most part this would be the amount of extra load that could be placed on a feeder in the back-feed path;

minimize the number of switching operations, so as to improve the whole reliability;

balance restored loads among different feeders if possible.

For the exemplary system shown in FIG. 3, one has for instance the resulting restoration (or contingency) plans shown in the following table:

| Ctgy | Load | T1 | SwPr1 | Ld1 | T2 | SwPr2 | Ld2 | T3 | SwPr3 | Ld3 |
|------|------|----|-------|-----|----|-------|-----|----|-------|-----|
| S1   | 400  | S7 | S2    | 150 | S9 | S6    | 50  | S8 | S4    | 200 |
| S2   | 300  | S7 | S3    | 200 | S8 | S5    | 100 |    |       |     |
| S3   | 250  | S8 | S4    | 200 | S9 | S6    | 50  |    |       |     |
| S4   | 150  | S8 | S5    | 100 | S9 | S6    | 50  |    |       |     |
| S5   | 100  |    | NA    |     |    |       |     |    |       |     |
| S6   | 50   |    | NA    |     |    |       |     |    |       |     |
| S10  | 50   |    | NA    |     |    |       |     |    |       |     | wherein each row is the restoration plan for a fault occurring in a specific zone of the feeder (e.g. S1 indicates the zone between switch S1 and S2); the column "Load" indicates the load current at the switching device location (e.g. S1); the column T1 indicates the Tie switching devices that connect the feeder 2 with the additional feeders 200; the columns "SwPr1", "SwPr2," "SwPr3" indicate the switching devices 3 to be operated to isolate the fault and to isolate the faulted feeder before tie switches are closed;—the columns "Ld1," "Ld2" "L3," indicate the amount of load picked up by a tie switching device. For example the second line (S2) of the table indicates that if there is a fault in the zone between S2 and S3 (zone Z2) then the restoration plan is the following:

Switching device S3 needs to open to isolate the fault;

Switching device S5 needs to open to isolate feeder 2 from the other feeders 200 before the tie switches S7, S8 can close;

Tie switch S7 needs to close so as to restore power to the zones Z3, Z4 and Z6;

Tie switch S8 needs to close so as to restore power to the zone Z5;

the feeder 200 connected to the tie switch S7 will 'see' an increment of the load of 200A resulting from having picked-up the zones Z3, Z4, Z6 that were part of feeder 2 before the fault occurred in zone Z2;

the feeder 200 connected to the tie switch S8 will see an increment of the load of 100A;

preferably presence of voltage on the feeders 200 at tie switches S7 and S8 is verified before closing the S7 and S8.

All the restoration actions in the plan occur after the fault has been cleared by the switching device S2 which is assumed to be a recloser in this specific example.

In instead the switching device S2 is not a recloser, the fault would be cleared by the first switching device 3 which is upstream from the faulted zone relative to the power source 1 and has the capability to clear the fault, for example the switching device S1. In this case, likewise the switching device S3, the switching device S2 will be instructed to open to isolate the fault.

Each master IED 5 will calculate the contingencies it is responsible for. Usually there is a master IED for each feeder, however in case more master IEDs are present they will be responsible for certain zones of the feeder and execute the restoration plans for faults occurring in their zones.

In order to execute the restoration plan, the master IED loads the actions to be performed in the System Application Queue, an example of which is shown in the table below:

| Event Type | Feeder Status | Device | Status | Timestamp |
| --- | --- | --- | --- | --- |
| | Normal | S1 | | 11:00:00 |
| Fault Detect | Alarm | S2 | Executed | 11:03:05 |
| Fault Isolate | Alarm | S3 | Executed | 11:33:06 |
| Load Isolate | Reconfig | S5 | Planned | |
| Close Tie | Reconfig | S7 | Planned | |
| Close Tie | Reconfig | S8 | Planned | |

The system application queue above contains the actions that have been described earlier for the restoration plan of a zone 2 (Z2) fault.

After the faulted zone between switching devices S2 and S3 has been repaired, then there could be a need to return the power system to its original pre-fault configuration. This operation can be executed manually or in an automated operation depending on the application. If the return to the pre-fault condition is automated, then the manual closing of the switching device(s) used to clear (assuming that the device is a recloser or breaker, i.e. it has fault interrupting capabilities) the fault from the upstream side (switching device S2 in this example) could be the trigger for this process. If voltage sensing is available, then this could be used as an input as well. To prepare for return to pre-fault configuration, the master IED 5 generates a switching sequence and places this sequence into the system application queue. An example of what this queue would look like is shown in the following table:

| Event Type | Feeder Status | Device | Status | Timestamp |
| --- | --- | --- | --- | --- |
| Power Restored | Reconfig | S2 | Executed | 13:50:00 |
| Open Tie | RestoreToOrig | S7 | Planned | |
| Close Sectionalizer | RestoreToOrig | S3 | Planned | |
| Open Tie | RestoreToOrig | S8 | Planned | |
| Close Sectionalizer | RestoreToOrig | S5 | Planned | |

Advantageously, in the method and system according to the present invention, in addition to the fault isolation and restoration functions above described, it is possible to implement other protection and control schemes so as to enhance the performance of the protection and control algorithms residing in the IEDs.

In particular, the various switching devices 3 have within their associated IEDs, pre-determined primary and secondary settings defining their way of operations. For example, one setting can be the number of shots or attempts that a recloser may execute in presence of a fault before permanently locking out in the open position thus interrupting the flow of power from the power source 1. Other settings can be the pickup levels and trip characteristics of a switching device defining the threshold for intervening in the case of a fault. When a fault occurs on a system and is located, the fault location can be helpful in an adaptive protection scheme, in order to modify the settings. As for the example of FIGS. 3 and 5-8, if the fault occurs between the switching devices S2 and S3, one or more of the various IEDs, for example the IED 5 associated with S1 receives through the communication system the fault location information and then can change its (primary or alternate) settings, for example reducing the number of shots at the time the feeder on that side of the loop has been shortened. Likewise, it is possible to dynamically compute new pickup levels and trip characteristics (for both primary and alternate settings) when the system reconfigures after a fault or changes in the system loading are observed. The new settings are based on real-time or pre-fault voltage and/or current values. The real-time values can be used even if a change in system loading was observed without a fault. The pre-fault values can be used if a fault had occurred on the system, causing reconfiguration. In this way, by modifying the protection and control settings in one or more of the IEDs after a fault, the reaction to subsequent system disturbances is greatly improved.

In addition, in order to improve safety in the field for utility personnel, in the system and method according to the invention it is possible to implement an auto-hot line tagging application. This application involves hot line tagging a switching device 3, such as a recloser or a sectionalizer when maintenance is being performed on a feeder segment in the system. When a switching device is open and is hot line tagged, it cannot re-close. When a closed device is hot line tagged, it is set to one shot mode, in which it trips and locks out when a subsequent fault occurs. When maintenance personnel hot line tag an IED in the power system, the upstream device is also hot line tagged via communication between the two IEDs.

Finally, when an upstream switching device operates to clear a permanent fault, downstream switching devices have to switch to backup battery voltage to power the associate IEDs. If the outage is sustained over a long period of time, then there is the possibility that the battery voltage will drop too low to operate the switching device in the case of a fault occurring immediately after the primary voltage returns. In the present invention, switching devices 3 auto open before the battery voltage drops below a certain threshold. This is a safety precaution when maintenance personnel have repaired faulted sections of the feeder and want to close the sections back into the feeder. When an IED auto-opens it can transmit messages to remote IEDs indicating that it has opened the switching device due to this problem. The advantages of this application are that utility maintenance personnel are notified by upstream IEDs of the switching device statuses, and that system IEDs will know how to react if a fault occurs soon after the power is restored.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for restoring power to loads connected to a first feeder powered by a power source, said first feeder being provided with a plurality of switching devices and at least one master electronic device which is in operative communication with said switching devices and has a plurality of power restoration plans stored therein, the method comprising:

upon occurrence of a fault in a zone of said first feeder, isolating the faulted zone from the power source using a first one of said switching devices which is positioned upstream from the faulted zone relative to the power source thereby disconnecting power to loads connected to the faulted zone and non-faulted zones of the first feeder;

using the identity of the switching device which is closest to and upstream from the faulted zone relative to the power source, selecting a power restoration plan from the plurality of restoration plans stored in said master electronic device; and in accordance with said restoration plan, outputting instructions from said master electronic device to instruct a second one of said switching devices which is downstream from the faulted zone relative to the power source to operate thereby isolating said faulted zone from loads connected to non-faulted zones of the first feeder which are downstream from the faulted zone relative to said power source outputting instructions from said master controller to one or more of said switching devices other than said first and second switching devices to operate thereby isolating loads connected to non-faulted zones of said first feeder from said one or more additional feeders before connecting non-faulted zones of the first feeder to said one or more additional feeders; and verifying if said one or more of said switching devices other than said first and second switching devices successfully operated thereby isolating loads connected to non-faulted zones of the first feeder from said one or more additional feeders before connecting the non-faulted zones of the first feeder to one or more of said additional feeders.

2. The method according to claim 1, comprising selecting said power restoration plan from the set of restoration plans using also information supplied by said switching devices to said master electronic device on pre-fault current levels flowing through said first feeder.

3. The method of claim 1, wherein the switching device which is closest to and upstream from the faulted zone relative to the power source is said first switching device.

4. The method according to claim 1, further comprising:

verifying the presence of voltage on said one or more additional feeders before connecting the non-faulted zones of the first feeder to one or more of said additional feeders;

instructing one or more of said switching devices to connect non-faulted zone of said first feeder to one or more of said additional feeders.

5. The method according to claim 1, wherein said switching devices comprise one or more predetermined settings, and the method further comprises modifying said one or more predetermined settings.

6. The method according to claim 1, wherein each of said switching devices is operatively coupled to a corresponding back-up battery suitable to supply power to the associated switching device when power is disconnected upon occurrence of a fault, and the method further comprises auto-opening of each switching device before the level of charge of the corresponding back-up battery is below a predetermined threshold.

7. An electrical power system comprising:

at least one power source;

at least a first feeder powered by said power source and feeding a plurality of loads connected therewith, said first feeder being provided with a plurality of switching devices; and at least a first master electronic device operatively associated with said first feeder and having a plurality of power restoration plans stored therein, said first master electronic device being in operative communication with said switching devices; wherein upon occurrence of a fault in a zone of said first feeder, a first one of said switching devices which is positioned upstream from the faulted zone relative to the power source isolates the faulted zone from the power source thereby disconnecting power to loads connected to the faulted zone and non-faulted zones of the first feeder, and then said master electronic device first selects a power restoration plan from said plurality of power restoration plans stored using the identity of the switching device which is closest to and upstream from the faulted zone relative to the power source and then outputs instructions to one or more of said switching devices so as to execute the restoration plan selected and restore power to at least some of the loads connected to the non-faulted zones of the first feeder from one or more additional feeders connected to said power source or to one or more additional power sources the switching device which is closest to and upstream from the faulted zone relative to the power source is said first switching device, and said first master electronic device outputs instructions to a second one of said switching devices to isolate said faulted zone from loads connected to non-faulted zones of the first feeder which are downstream from the faulted zone relative to said power source, and then verifies if said second switching device successfully executed the instructions output to it;

wherein said first master electronic device further outputs instructions to one or more of said switching devices other than said first and second switching devices to isolate loads connected to non-faulted zones of said first feeder from said one or more additional feeders before connecting non-faulted zones of the first feeder to said one or more additional feeders, and then verifies if said one or more of said switching devices other than said first and second switching devices successfully executed the instructions output to them.

8. The electrical power system according to claim 7, wherein said first master electronic device selects said power restoration plan from the set of restoration plans using also information supplied by said switching devices to said master electronic device on pre-fault current levels flowing through the first feeder.

9. The electrical power system according to claim 7, wherein said first master electronic device comprises:

a communication unit for operatively communicating at least with said switching devices;

a memory storing said set of power restoration plans; and a microprocessor selecting said power restoration plan from said set of power restoration plans stored and outputting instructions to one or more of said switching devices so as to execute the selected restoration plan.

10. The electrical power system according to claim 7, wherein said first master electronic device and said switching devices are in operative communication in a master-to-slave configuration.

11. The electrical power system according to claim 7, wherein said first master electronic device is in a wireless operative communication with said switching devices.

12. The electrical power system according to claim 7, wherein said first master electronic device is in a wired operative communication with said switching devices.

13. The electrical power system according to claim 7, further comprising one or more additional feeders which are connected to said power source or to one or more alternative power sources, each of said one or more additional feeders being provided with an associated master electronic device which is in a peer-to-peer communication with said first master electronic device 14. The electrical power system according to claim 7, wherein said first master electronic device further verifies the presence of voltage on said one or more additional feeders before connecting non-faulted zones of the first feeder to one or more of said additional feeders, and then instructs one or more of said switching devices to connect non-faulted zone of said first feeder to one or more of said additional feeders.

15. An electronic control device suitable to be used in a power system comprising at least a power source, at least a first feeder powered by said power source and feeding a plurality of loads connected therewith, and a plurality of switching devices distributed throughout said first feeder, the electronic control device comprising:
a communication unit for operatively communicating with said switching devices;
a memory storing a set of power restoration plans; and
a microprocessor which—upon occurrence of a fault in a zone of said feeder and operation of a first one of said switching devices isolating the faulted zone from the power source thereby disconnecting power to loads connected to the faulted zone and non-faulted zones of the first feeder—first selects a power restoration plan from said set of power restoration plans using the identity of the switching device which is closest to and upstream from the faulted zone relative to the power source and then outputs instructions to a second one of said switching devices which is downstream from the faulted zone relative to the power source, to operate thereby isolating said faulted zone from loads connected to non-faulted zones of the first feeder which are downstream from the faulted zone relative to said power source, the microprocessor verifies if said second switching device successfully operated; and the microprocessor outputs instructions to one or more of said switching devices other than said first and second switching devices to operate thereby isolating loads connected to non-faulted zones of said first feeder from said one or more additional feeders before connecting non-faulted zones of the first feeder to said one or more additional feeders and verifies if said one or more of said switching devices other than said first and second switching devices successfully operated thereby isolating loads connected to non-faulted zones of the first feeder from said one or more additional feeders before connecting the non-faulted zones of the first feeder to one or more of said additional feeders.

* * * * *